United States Patent
John Wilson et al.

(10) Patent No.: US 11,899,132 B2
(45) Date of Patent: Feb. 13, 2024

(54) SUPER-RESOLUTION ENHANCEMENT TECHNIQUES FOR RADAR

(71) Applicant: QUALCOMM Incorporated, San Diego, CA (US)

(72) Inventors: Makesh Pravin John Wilson, San Diego, CA (US); Volodimir Slobodyanyuk, San Diego, CA (US); Sundar Subramanian, San Diego, CA (US); Radhika Dilip Gowaikar, San Diego, CA (US); Michael John Hamilton, San Diego, CA (US); Amin Ansari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/029,722

(22) Filed: Sep. 23, 2020

(65) Prior Publication Data
US 2021/0208247 A1 Jul. 8, 2021

Related U.S. Application Data

(60) Provisional application No. 62/957,039, filed on Jan. 3, 2020.

(51) Int. Cl.
G01S 7/41 (2006.01)
G01S 7/487 (2006.01)
G01S 13/524 (2006.01)

(52) U.S. Cl.
CPC .............. *G01S 7/414* (2013.01); *G01S 7/417* (2013.01); *G01S 7/4873* (2013.01); *G01S 13/5244* (2013.01)

(58) Field of Classification Search
CPC ........ G01S 7/414; G01S 7/417; G01S 7/4873; G01S 13/52; G01S 13/5244; G01S 13/931
See application file for complete search history.

(56) References Cited

U.S. PATENT DOCUMENTS

2012/0033852 A1* 2/2012 Kennedy ................ G06F 18/00
382/103
2016/0334502 A1* 11/2016 Ali ........................ G01S 13/343
(Continued)

OTHER PUBLICATIONS

Wikipedia DBSCAN entry edited on Dec. 17, 2019, accessed at <https://en.wikipedia.org/w/index.php?title=DBSCAN&oldid=931199322> on Aug. 10, 2023 (Year: 2019).*

*Primary Examiner* — Donald H B Braswell
(74) *Attorney, Agent, or Firm* — Weaver Austin Villeneuve & Sampson LLP (57) ABSTRACT

Embodiments provided herein allow for identification of one or more regions of interest in a radar return signal that would be suitable for selected application of super-resolution processing. One or more super-resolution processing techniques can be applied to the identified regions of interest. The selective application of super-resolution processing techniques can reduce processing requirements and overall system delay. The output data of the super-resolution processing can be provided to a mobile computer system. The output data of the super-resolution processing can also be used to reconfigure the radar radio frequency front end to beam form the radar signal in region of the detected objects. The mobile computer system can use the output data for implementation of deep learning techniques. The deep learning techniques enable the vehicle to identify and classify detected objects for use in automated driving processes. The super-resolution processing techniques can be implemented in analog and/or digital circuitry.

27 Claims, 5 Drawing Sheets

(56) References Cited

U.S. PATENT DOCUMENTS

2018/0348343 A1* 12/2018 Achour ................. H01Q 1/364
2020/0342250 A1* 10/2020 Smirnov .............. G06V 10/763
2021/0124011 A1*  4/2021 Madhow ................ G01S 13/86
2022/0034995 A1*  2/2022 Sahara ................. G01S 13/282

* cited by examiner

SUPER-RESOLUTION ENHANCEMENT TECHNIQUES FOR RADAR

RELATED APPLICATION(S)

This application claims priority to and incorporates by reference commonly-owned U.S. Patent Application Ser. No. 62/957,039, filed Jan. 3, 2020, entitled "Super-Resolution Techniques for Automotive Radar," in its entirety and for all purposes.

BACKGROUND

Radar sensors can be installed in automated or self-driving vehicles. The native resolution of radar sensors can be inadequate to determine separation of two vehicles at a distance, determine separation of a vehicle and a motorcycle, and determine separation of a parked vehicle and a pedestrian. Super-resolution processing techniques can be used to improve the resolution of radar returns. The improved resolution can be used to help automated vehicles make better decisions. However, applying super-resolution processing techniques to the entire radar return signal can involve a significant level of complexity and result in delays in processing the radar data.

SUMMARY

According to some aspects of the disclosure, techniques for providing super-resolution for radar can include performing pre-processing to identify one or more regions of interest within radar data. One or more super-resolution techniques may then be performed on the one or more regions of interest, and a super-resolution output can be provided to one or more components within a radar sensor and/or a separate device (such as a central computer). For vehicle applications, deep learning techniques may be applied to the output of the super-resolution processing to perform one or more automated driving functions.

An example method of providing super-resolution for radar, according to this disclosure, comprises, obtaining radar data from one or more radar signals, performing one or more pre-processing techniques on the radar data, and determining one or more regions of interest based on an output of the one or more pre-processing techniques, wherein each of the one or more regions of interest comprises a contiguous subset of the radar data in one or more dimensions. The method further comprises responsive to the determining the one or more regions of interest, performing super-resolution processing of the one or more regions of interest, and providing an output of the super-resolution processing of the one or more regions of interest.

An example device, according to this disclosure, comprises a transceiver, a memory, and one or more processing units communicatively coupled with the transceiver and the memory. The one or more processing units are configured to obtain, via the transceiver, radar data from one or more radar signals, perform one or more pre-processing techniques on the radar data, and determine one or more regions of interest based on an output of the one or more pre-processing techniques, wherein each of the one or more regions of interest comprises a contiguous subset of the radar data in one or more dimensions. The one or more processing units are further configured to, responsive to the determining the one or more regions of interest, perform super-resolution processing of the one or more regions of interest, and provide an output of the super-resolution processing of the one or more regions of interest.

Another example device, according to this disclosure, comprises means for obtaining radar data from one or more radar signals, means for performing one or more pre-processing techniques on the radar data, and means for determining one or more regions of interest based on an output of the one or more pre-processing techniques, wherein each of the one or more regions of interest comprises a contiguous subset of the radar data in one or more dimensions. The example device further comprises means for performing super-resolution processing of the one or more regions of interest in response to the determining the one or more regions of interest, and means for an output of the super-resolution processing of the one or more regions of interest.

An example non-transitory computer-readable medium, according to this disclosure, has instructions stored thereby which, when executed by one or more processing units, cause the processing units to perform functions including obtaining radar data from one or more radar signals, performing one or more pre-processing techniques on the radar data, and determining one or more regions of interest based on an output of the one or more pre-processing techniques, wherein each of the one or more regions of interest comprises a contiguous subset of the radar data in one or more dimensions. The functions further include, responsive to the determining the one or more regions of interest, performing super-resolution processing of the one or more regions of interest; and providing an output of the super-resolution processing of the one or more regions of interest.

These and other embodiments are described in detail below. For example, other embodiments are directed to systems, devices, and computer readable media associated with methods described herein. A better understanding of the nature and advantages of embodiments of the present disclosed may be gained with reference to the following detailed description and the accompanying drawings.

Like reference symbols in the various drawings indicate like elements, in accordance with certain example implementations. In addition, multiple instances of an element may be indicated by following a first number for the element with a letter or a hyphen and a second number. For example, multiple instances of an element 1100 may be indicated as 1100-1, 1100-2, 1100-3 etc. or as 1100a, 1100b, 1100c, etc. When referring to such an element using only the first number, any instance of the element is to be understood (e.g., element 1100 in the previous example would refer to elements 1100-1, 1100-2, and 1100-3 or to elements 1100a, 1100b, and 1100c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Radar sensors can perform scans to provide imaging in automotive and other applications. Scans can be taken, for example, across different elevations, estimates, ranges, and/or Doppler to provide a 3D map of Channel Impulse Responses (CIRs) of scanned areas, which can provide more information and may be more robust in adverse conditions (e.g., adverse lighting and/or weather conditions) than traditional cameras. Radar scans can therefore provide valuable information that can complement existing automotive systems. For example, data from one or more radar scans can be used by an automobile to correct simultaneous localization and mapping (SLAM) information, correct object detection, and more, which may be used for automated driving systems, navigation, and/or other functions.

"Super resolution" can be performed on radar data to provide higher resolution than what native radar scans can provide. That is, as used herein, the terms "super-resolution," "super-resolution techniques," "super-resolution algorithms," "super-resolution processing," and the like refers to signal processing techniques that increase the resolution in radar data beyond the native Rayleigh resolution of a radar in one or more dimensions (e.g. azimuth, elevation, Doppler, range). Such techniques include Multi Signal Classification (MUSIC) and Estimation of Signal Parameters by Rotational Invariance Techniques (ESPRIT), for example. As noted, however, supra-resolution schemes typically involve a significant level of complexity.

According embodiments described herein, efficient radar data processing can be achieved by identifying regions of interest within the radar data, then performing super-resolution algorithms only on the identified regions of interest. Among other things, as noted, such embodiments can utilize far less processing power than traditional super-resolution techniques while maintaining the benefits the use of such techniques provides. That is, this selective application of super-resolution processing techniques in this manner can reduce processing requirements and overall system delay. In some embodiments, the output data of the super-resolution processing can be provided to a mobile computer system, such as a central computer. According to some embodiments, the output data of the super-resolution processing can also be used to reconfigure the radar radio frequency (RF) front end in order to beam form the radar signal in region of the detected objects (also referred to herein as "targets"). According to some embodiments, the mobile computer system can use the output data for implementation of deep learning techniques. The deep learning techniques enable the vehicle to identify and classify detected objects for use in automated driving processes. The super-resolution processing techniques can be implemented in analog and/or digital circuitry.

It can be noted that, although embodiments described herein are described in the context of vehicle applications (e.g., radar used as vehicle sensors), embodiments are not so limited. The systems, devices, and/or methods described herein may be used in other applications. As such, embodiments herein may be utilized in any of a variety of electronic devices in which, for example, object identification and/or differentiation may be used. Example electronic devices include mobile phones, tablets, laptops, personal computers (PCs), televisions, security devices (e.g., cameras, access points, etc.) and other electronic devices.

Figure 1:
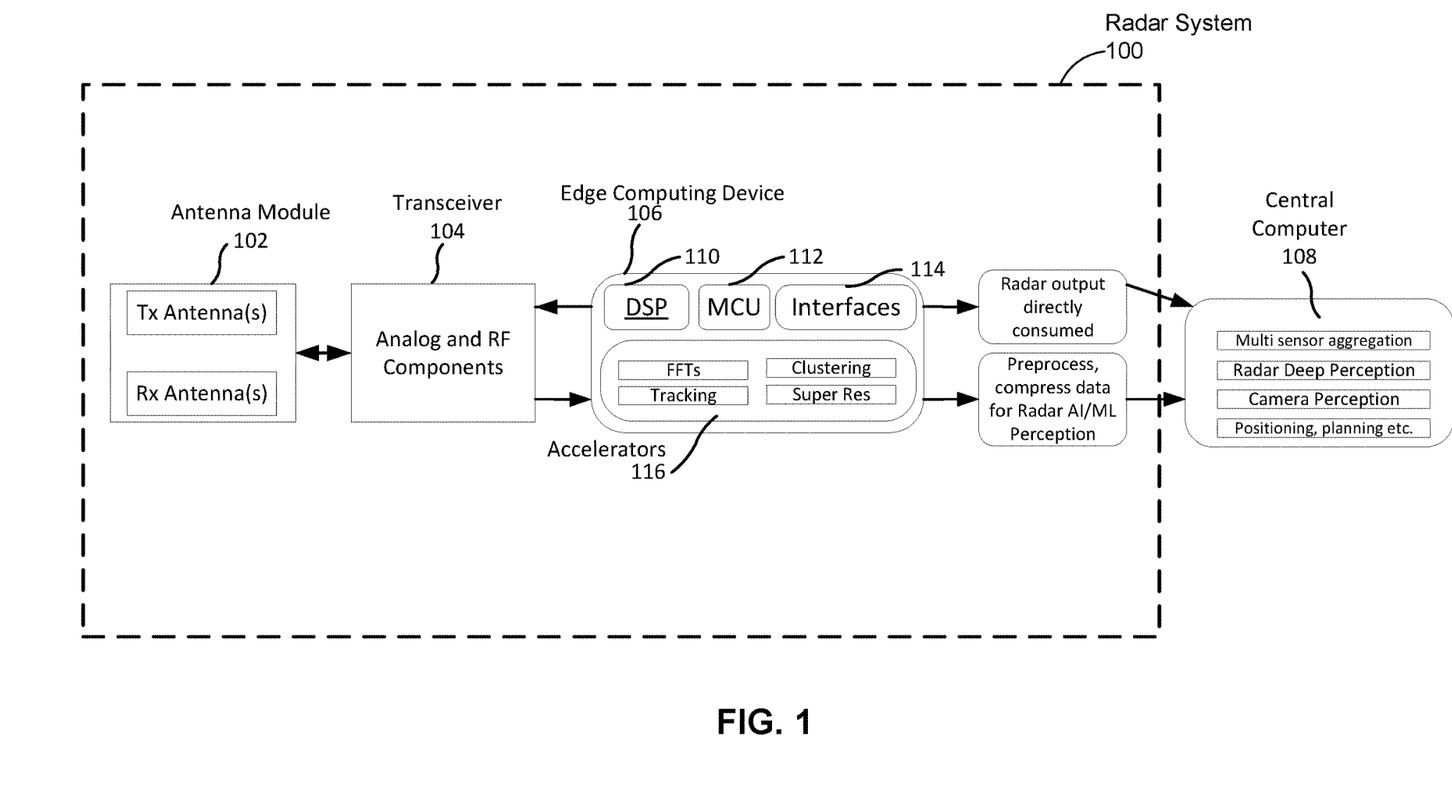
FIG. 1 is a simplified drawing of a radar sensor that can be used for an automotive radar, according to an embodiment.

FIG. 1 is a simplified drawing of a radar sensor system 100 that can be used for automotive radar, which can be used to implement the techniques for providing super-resolution described herein below, according to an embodiment. The radar system 100 can be used to detect the location and/or speed one or more objects in the vicinity of a vehicle (e.g., in front, behind, or to either side of the vehicle). The radar system 100 can be used, for example, in autonomous vehicles, semi-autonomous vehicles (e.g., vehicles equipped with Advanced Driver-Assistance Systems (ADAS)), and the like. In some embodiments, the radar system 100 may be integrated into a single radar sensor located on a vehicle. Moreover, a vehicle may have more than one such radar sensors, which may provide radar sensing in multiple directions around the vehicle.

Put generally, the radar system 100 can perform a scan by transmitting and receiving radar signals across different elevations, estimates, ranges, and/or Doppler. A scan may be used to create a 3D map of CIRs of a scanned area. Often a Fast Fourier Transform (FFT) is used as a distance estimate technique for detecting objects. The peaks of the FFT can correspond to objects detected and the frequencies of the peaks can correspond to the distances of the objects. Using these techniques, the minimum distance to resolve two objects and determine their respective distances is known as the Rayleigh limit, or c/2B, where c is the speed of light and B is the bandwidth of the radar signal. The limits to Doppler resolution of a radar system depend on maximum dwell time of a radar system that is inversely proportional to total time. The limits of azimuth or elevation resolution are inversely proportional to aperture size of the radar antenna or antenna configuration. These limits on resolution can, for example, prevent the radar system 100 from identifying two objects are spaced closely together because the larger object can tend to hide the smaller object. The radar system 100 can, however, perform super-resolution processing to overcome these limits on resolution.

The radar system 100 can have multiple components including an antenna module 102, a transceiver 104, an edge computing device 106, and a central computer 108. The edge computing device 106 can include one or more digital signal processors 110, a microcontroller 112, one or more interfaces 114, and one or more accelerator components 116. The various components can be communicatively connected via wired and/or wireless communications. FIG. 1 is a notional drawing and the various components can be configured as a single form-factor device or can be combined as various different devices. In some embodiments, the antenna module 102, the transceiver 104, and the edge computing device 106 can be positioned in close proximity for high-data throughput. In these embodiments, the central computer 108 can be located in a different area of the vehicle where there can be additional space.

The antenna module 102 can be used for both transmitting and receiving the radar signals. In some embodiments, antenna module 102 may comprise two separate antennas or sets of antennas, as illustrated, which can be used for transmitting the radar signals ("Tx antenna(s)") and for receiving the radar signals ("Rx antenna(s)"). Radar signals transmitted by the Tx antenna(s) of the antenna module 102 can reflect off of nearby objects and be received by the Rx antenna(s) of the antenna module 102. The received radar signals can then be sent from the antenna module 102 as radar data to the transceiver 104 (e.g., via physical wiring). In various embodiments, the Tx antenna(s) can include multiple antenna components to form an antenna array, and/or the Rx antenna(s) can include multiple antenna components to form an antenna array. In this way, the Rx and/or Tx antenna arrays can be used to employ the beamforming techniques described below.

The transceiver 104 is a component capable of both transmitting and receiving radar signals. The transceiver 104 can include various analog and digital RF components. The transceiver 104 can include transmitter and/or receiver components, which may include transmitter and receiver components on a single chip (integrated circuit or IC), or on separate chips. Received data from the transceiver 104 can be sent for processing to the edge computing device 106. The transceiver 104 can send electronic signals to the antenna module 102 that result in generation of radar signals that are transmitted by the antenna module 102 in the manner previously described. As noted, the transceiver 104 can receive radar data from the antenna module 102 following the reception of corresponding radar signals at the antenna module 102.

Depending on desired functionality, the radar system 100 may use continuous-wave (CW) radar and/or pulse radar systems. Continuous-wave (CW) radar transmits and receives at the same time. The transmitter generates a continuous sinusoidal oscillation at frequency $f_t$ that is radiated by the antenna. On reflection by a moving target, the transmitted signal is shifted via the Doppler effect by an amount fa. It is also possible to measure range using a CW radar system by frequency modulation, or digital modulation techniques such as phase shift keying (PSK). A systematic variation of transmitted frequency or phase places a unique time stamp on the transmitted wave at every instant. By measuring the frequency or phase of the received signal, the time delay between transmission and reception can be measured and therefore the range can be measured. An equation for the calculation of range is as follows:

$$R = c\frac{T}{2}\frac{\Delta f}{f_2 - f_1},$$

where c is the speed of light, $\Delta f$ is the difference between the transmitted and received signals, $f_2$ is the maximum transmitted frequency, $f_1$ is the minimum transmitted frequency and T is the period between $f_1$ and $f_2$, and the velocity is given by the following equation:

$$v = \frac{dR}{dt}.$$

A pulse radar (or pulse Doppler radar) has the advantage of being able to detect small amplitude moving target returns against a large amplitude clutter background. Pulse-delay ranging is based on the measurement of the time delay between the transmitted pulse and the received echo and is provided by the following equation:

$$R = c\frac{\Delta T}{2},$$

where c is the speed of light, $\Delta T$ is the time difference between transmitted and received pulse and echo.

The velocity is related to the Doppler frequency shift between the transmitted pulse and received echo as provided by the equation:

$$v = \frac{f_d \lambda_0}{2},$$

where $f_d$ is the Doppler frequency shift and $\lambda_o$ is the free space wavelength at the center frequency.

Pulse Doppler radars are half-duplex, meaning that they either transmit or receive, which results in high isolation between the transmitter and receiver, thus increasing the dynamic range of the receiver and the range detection of the radar. The disadvantage of this system is the existence of a blind zone given by the following equation:

$$R_b = c\frac{(\tau_p + t_s)}{2},$$

where $\tau_p$ is the pulse width, and $t_s$ is the switching time of the transmit and receive switch, if applicable. Pulse Doppler radar systems are therefore better suited for long-range detection, whereas frequency-modulated continuous wave (FMCW) radar is better suited for short-range detection. In one embodiment, a pulse-modulated waveform can be used that is full duplex.

Based on a command signal from the edge computing device 106, the transceiver 104 can generate a series of radar pulses transmitted by the antenna module 102. One or more transmitted radar signals can reflect off one or more objects within a scanned area and reflected radar signals (or radar return) be received by the antenna 102, as noted. Radar data indicative of the received radar signals can be sent to the transceiver 104. In the transceiver some pre-processing (amplification, etc.) can be performed on the radar data. The radar data can then be passed to the edge computing device 106, which can perform additional processing of the radar data.

The edge computing device 106 can include one or more accelerator elements 116. The accelerator elements 116 can include one or more hardware components or software (e.g., firmware) routines that can perform processing on the radar data received from the transceiver 104. In some embodiments, the accelerator elements 116 can be incorporated into a chip comprising the transceiver 104 or included as one or more chips proximate thereto. In some embodiments, can be incorporated into a Digital Signal Processor (DSP) 110 and/or a microcontroller unit (MCU) 112 of the edge computing device 106, or included as one or more chips proximate thereto. The one or more accelerator elements 116 may be configured to process the radar data by performing Fast Fourier Transform (FFT), clustering, tracking, and/or super-resolution on the radar data. As used herein, the terms "pre-processing," "pre-processing techniques," and variations thereof refer to processing performed on the radar data prior to super-resolution processing. As indicated in FIG. 1, accelerators 116 may comprise components configured to perform such pre-processing and/or super-resolution. Additional details regarding these processes are provided hereafter.

The edge computing device 106 can also include one or more DSPs 110. The DSP 110 may comprise a special purpose or general purpose processing unit configured to perform various signal processing functions using hardware and/or software means. As such, the DSP 110 may comprise an Application-Specific Integrated Circuit (ASICs) or a specialized microprocessor (or a System in a Package (SiP) block) chip, with its architecture optimized for the operational needs of digital signal processing. DSP 110 may use special memory architectures and/or may implement data compression technology.

The edge computing device 106 can also include an MCU 112. The MCU 112 may comprise one or more processor cores along with memory and programmable input/output peripherals. Program memory in the form of ferroelectric RAM, NOR flash or OTP ROM is also often included in the MCU 112, as well as a small amount of RAM.

One or more interfaces 114 can enable the edge computing device to communicate data between the radar system 100 and a central computer 108. This data can include, for example, output from super-resolution processing of radar data as described above. According to some embodiments, the central computer 108 can then perform additional operations (e.g., compress the data for radar artificial intelligence/machine learning perception, as shown in FIG. 1) of the data received from the radar system 100. In the central computer 108, multiple operations can be performed including but not limited to multi-sensor aggregation, radar deep perception, camera perception, and positioning and planning. An embodiment of a central computer 108 may comprise a mobile computer system as discussed in greater detail below with respect to FIG. 5.

Figure 2:
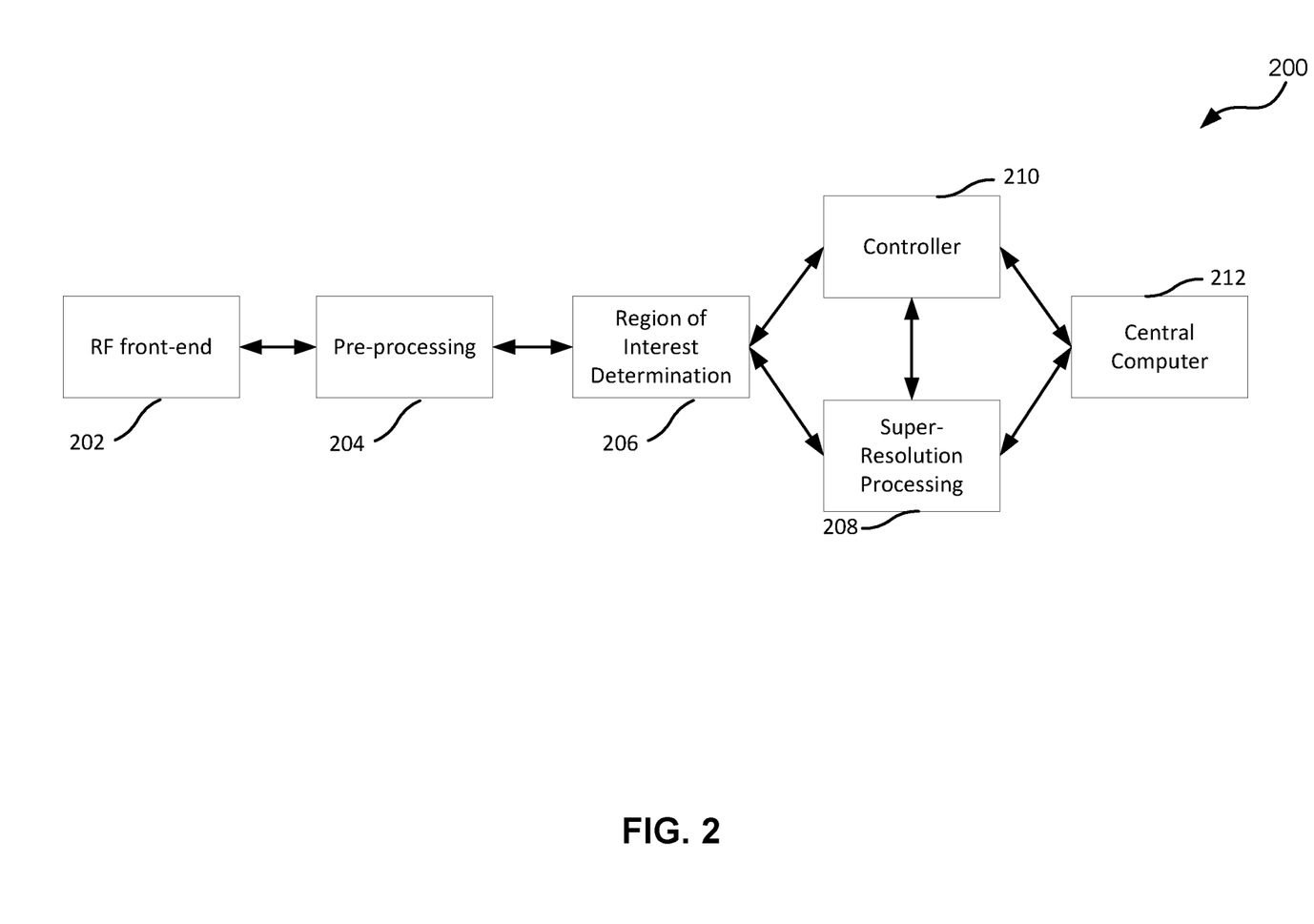
FIG. 2 illustrates an exemplary functional diagram for techniques for super-resolution processing of radar data, according to an embodiment.

FIG. 2 illustrates a block diagram 200 for a system providing super-resolution for radar according to an embodiment, in which one or more regions of interest are identified in radar data, and in which super-resolution is performed on the one or more regions of interest. The operations shown in one or more of the blocks of the block diagram 200 may be performed by one or more components illustrated in FIG. 1, including the radar system 100 and central computer 108. Put differently, the blocks in block diagram 200 illustrate a functional representation of a system that may be used to perform embodiments providing super-resolution described herein, and FIG. 1 may show an implementation of such a system.

The RF front-end 202, which may comprise the antenna module 102 and transceiver 104 of FIG. 1 may obtain radar data by receiving and amplifying radar signals reflected from nearby objects. The sampling of received signals may be timed in coordination with the transmission of signals (e.g., also by the RF front-end 202) to determine the distance of nearby objects, based on times at which the radar signals are received. The transceiver 104 can output video signals to the edge computing device 106. This radar data can include intensity values across different dimensions (e.g., azimuth, elevation, Doppler, and/or range) proportional to the power of the received radar signals. Such values may also be indicative of interference received by the RF front-end 202.

RF front-end 202 may not only include antenna components, but may also comprise a mixing stage of a receiver and possibly the power amplifier of the transmitter. In some embodiments, the RF front-end 202 can include the components in the receiver that process RF signals at the original incoming RF before it is converted to a lower intermediate frequency (IF). (Again, this may comprise antenna 102 and transceiver 104 of FIG. 1.)

In various embodiments, the RF front-end 202 can comprise a band-pass filter (BPF), a low-noise amplifier (LNA), a local oscillator (LO), and a mixer. A BPF can be used to remove unwanted signals that may otherwise interfere with the desired signal. It may also prevent strong out-of-band signals from saturating the input stages. The LNA may comprise an RF amplifier that is used to increase the sensitivity of the receiver by amplifying weak signals without contaminating them with noise, so that they can stay above the noise level in succeeding stages. The LNA May have a very low noise figure (NF). A LO can generate a radio frequency signal at an offset from the incoming signal, which can be mixed with the incoming signal. The mixer can mix the incoming signal with the signal from the local oscillator to convert the signal to the IF.

As noted, pre-processing 204 may comprise one or more of several processing techniques performed on the radar data prior to super-resolution processing. The pre-processing 200 for on an edge computing device 106. In some embodiments, pre-processing 200 for may include performing one or more FFTs on the radar data to obtain one or more of the range to the target, a Doppler of the target, an azimuth of the target, and an elevation of the target. Additionally or alternatively, FFTs can be used to group the radar data into groups or tensors. For example, range, elevation, azimuth, and/or Doppler can be used to identify objects in the radar data.

The pre-processing 204 can also include constant false alarm rate (CFAR) processing. CFAR processing, which can be executed by hardware and/or software components (e.g. on an edge computing device 106) can be used to determine the power threshold above which intensity values of radar data can be considered to probably originate from a target object (e.g., a vehicle, a motorcycle, a bicycle, or a pedestrian). For example, prior to using CFAR processing, the radar data may include a 100 by 100 grid of intensity values (e.g., range and azimuth). CFAR techniques can reduce the number of intensity values by removing returns outside the threshold ranges. For example, the range can be limited to values in the grid from 38 to 40 in range.

A threshold for CFAR processing may be static or dynamic. If this threshold is too low, then more targets will be detected at the expense of increased numbers of false alarms. Conversely, if the threshold is too high, then fewer targets will be detected, but the number of false alarms will also be low. In most radar systems, the threshold can be set in order to achieve a required probability of a false alarm or equivalently, false alarm rate, or time between false alarms. If the background against which targets are to be detected is constant with respect to time and space, then a fixed threshold level can be chosen that provides a specified probability of a false alarm, governed by the probability density function of the noise, which is usually assumed to be Gaussian. The probability of detection can then be a function of the signal-to-noise ratio of the target return. However, in most fielded systems such as automotive systems, unwanted clutter and interference sources mean that the noise level changes both spatially and temporally. In this case, a changing threshold can be used, where the threshold level is raised and lowered to maintain a constant probability of a false alarm.

The pre-processing 204 can also include clustering that can associate points, within the radar data that are within a definite proximity to each other. These points may be intensity values within the radar data above a certain threshold and within a threshold proximity (along one or more dimensions within the radar data). In some embodiments, clusters may comprise a minimum number of such values, depending on desired functionality. In some embodiments, this number may simply be 1. In some embodiments, a cluster may comprise two or more points. Other embodiments may define a cluster having a higher number of points.

For example, points at ranges 36 m to 38 m having intensity values above a certain threshold may be determined to be within a threshold distance of each other and may therefore be determined to be a single cluster. By way of example, using the clustering techniques can reduce the 100 by 100 grid of points to just a few clusters of points.

The pre-processing 204 can also include tracking points and/or clusters across multiple scans. As noted, a radar scan may comprise transmitting and receiving radar signals along different dimensions (azimuth, elevation, Doppler, and/or range), creating a radar "image" or "frame" of a scanned area at roughly a single point in time. (The duration of a scanned can be a small fraction of a second.) Depending on desired functionality, a radar system may perform scans at a high frequency rate, often several times a second. Comparable to frames of video, sequential scans can enable detected objects to be tracked from one scan (or frame) to the next. Tracking can include the creation of plots of the location of a detected object over time. The radar data for moving objects across multiple scans can result in a plot that changes location over time. In some embodiments, tracking can allow a radar system 100 to calculate the tracked object's course, speed, and/or Closest Point of Approach (CPA) to the radar sensor system 100.

The output of the pre-processing at block 200 can then be used to determine one or more regions of interest for super-resolution processing. This can involve defining a region of interest around one or more points identified from the pre-processing performed at block 204. The size and shape of the region of interest may vary, depending in desired functionality. According to some embodiments, for example, an $N_1 \times N_2 \times N_3$ ... grid can be selected around the one or more points (e.g., peaks, clusters, etc.) in different dimensions. If a peak intensity value is identified at a specific range, azimuth, elevation, and Doppler, a region of interest may be defined as a window having a width of $N_1$ in the azimuth dimension, $N_2$ in the elevation dimension, $N_3$ in the Doppler dimension, and $N_4$ in the range dimension. This $N_1 \times N_2 \times N_3 \times N_4$ grid may be centered in each dimension at the corresponding identified peak, and values for region size in each dimension ($N_1$, $N_2$, etc.) may be different (or the same) and may be selected depending on desired functionality. For example, if a cluster around 40 meters in range is identified at an angle of 10 degrees, a region of interest may be defined from 35 to 45 meters in range from 5 degrees to 15 degrees in azimuth. In some instances, the region of interest may extend the entire axis of one or more dimensions (e.g., along all radar). In some instances, the region of interest may exclude one or more dimensions (e.g., exclude Doppler). That said, the inclusion of additional dimensions can provide additional information. For example, two vehicles next to each other can have different Doppler signatures if the vehicles cannot be easily separated in azimuth.

Can be noted that, the region of interest determination 206 reform regions of interest around points in the radar data that may be clustered or otherwise proximate. This may cause regions of interest may overlap. According to some embodiments, super-resolution therefore may be performed on the union of one region of interest with another, thereby avoiding the super-resolution processing of the overlapping radar data twice.

As noted, the region of interest determination 206 may be performed by an edge computing device 106 (e.g., by a DSP 110 or MCU 112) and may be based on points identified by pre-processing 204. These points can include, for example, FFT tensors, intensity value peaks and/or clusters, and/or radar data values output from CFAR, tracking, and/or Kalman filtering. For example, region of interest determination at block 206 can define a region based on intensity values of the tensors above a predetermined threshold.

In some embodiments, pre-processing at block 204 may identify where one or more peak intensity values may be in on or more dimensions of the radar data. The region of interest determination at 206 may then define a region of interest around each of the peaks as described above (e.g., defining the region as a window of radar data along one or more dimensions, which may be centered at the respective peak). In some embodiments, regions of interest may be determined for all peaks. In other embodiments, a subset of the peaks may be selected. This determination can be made in any of a variety of ways (e.g., peaks having a threshold intensity value, a predetermined number of peaks having the highest intensity values, etc.).

In various embodiments, multiple FFTs can be performed on the radar data over time. A difference between an output of an FFT at a first time and a second output of an FFT at a previous, second time can be used to identify a number of peaks and possible corresponding regions of interest. In some embodiments, the signal-to-noise (SNR) intensity can be used to identify peaks above a certain threshold, and regions of interest may be defined around the peaks in the manner previously described. Similarly, resulting peaks after CFAR processing can also be used to define regions of interest.

In various embodiments, the region of interest determination 206 can be based on clusters of intensity values in the radar data and form one or more regions of interest around the clusters. Cluster analysis or clustering is the task of grouping a set of objects in such a way that objects in the same group (called a cluster) are more similar (in some sense) to each other than to those in other groups (clusters). In this case, clusters may comprise groups of points in the radar data having similar intensity values. These points in the data may comprise, for example, peaks and/or points having values above a minimum threshold.

In various embodiments, the region of interest determination 206 can be based on tracking performed at pre-processing 204. As previously noted, tracking may involve identifying certain objects or features in the radar data and tracking them over a plurality of scans (frames). In some embodiments, the region of interest determination 206 may comprise defining a region of interest around a track, or tracked object/feature. Additionally or alternatively, some embodiments may define a region of interest around a plurality of tracks when the plurality of tracks appear to merge in one or more dimensions. By defining a region of interest around merged tracks, a radar system can benefit from the super-resolution processing of the region of interest to help further distinguish the separate tracts. Thus, according to some embodiments, when different tracks are within a certain threshold of each other (in one or more dimensions of the radar data), the region of interest determination 206 may form a region of interest around the tracks.

The process of forming a track the radar sensor system can include an association step in addition to a filtering step (e.g., using a Kalman Filter (KF), Extended Kalman Filter (EKF), particle filter, unscented Kalman filter, etc). For example, the system can have N tracks in Frame K−1, and in Frame K the system identifies M objects (which need not be same as N). So the tracking algorithm can include an association step to identify which of the M objects are associated (via a cost metric) with the N tracks. The association step can spawn a new track and/or prune old tracks.

In some embodiments, the radar sensor system can predict the position of N tracks in frame K from K−1, and then do association with the N objects. This can be done jointly also as in Joint Probability Density Association filter (JPAF) where filtering/association can be combined together.

An output of the region of interest determination 206 can then be provided to a controller 210 and super-resolution processing 208. As shown in FIG. 1, the super-resolution processing 208 may comprise hardware and/or software components of an edge computing device 106 configured to perform one or more super-resolution processing techniques on the one or more regions of interest in the radar data identified by the region of interest determination 206. Because the region of interest determination 206 can form regions of interest around objects identified in the radar data (e.g., vehicles, motorcycles, bicycles, pedestrians), super-resolution processing of these regions of interest can provide higher resolution of these objects. That is, as noted, super-resolution processing can allow an improved resolution that is beyond the native resolution of the radar sensor by improving an angular resolution (azimuth and/or elevation beam width), range (bandwidth), or Doppler (total duration) native to a radar system. This can help determine the type of object at a distance, identify which lane a vehicle is in, differentiate a pedestrian from a parked vehicle, and the like.

Super-resolution processing may vary. As noted, super-resolution algorithms such as MUSIC, ESPRIT, Matrix Pencil, Deep Learning, and others. A description of some of these algorithms follows. It can be noted, however, that only a few are described herein, the super-resolution processing 208 the use additional or alternative forms of super-resolution processing.

Some embodiments may utilize MUSIC super-resolution processing. MUSIC is an algorithm used for frequency estimation and radio direction finding that can be used for super-resolution processing. MUSIC is an eigenstructure-based direction finding technique that employs noise-subspace eigenvectors of a data correlation matrix for determining a null spectrum, whose minima are iteratively computed to yield regions of interest estimates. MUSIC techniques can require high computational and storage requirements because of the exhaustive search extended to a whole set of steer vectors.

MUSIC can provide asymptotically unbiased estimates of: (1) a number of incident wave fronts present; (2) directions of arrival (DOA) (or emitter locations); (3) strengths and cross correlations among the incident waveforms; (4) noise/interference strength. The MUSIC algorithm is based on the assumption that the signals received by each of the receiver antenna elements are uncorrelated so that the correspondingly determined signal correlation matrix is diagonal.

ESPRIT super-resolution processing is a vector subspace-based methodology that, instead of identifying the spectral peaks, can exploit the rotational invariance of the underlying signal subspace induced by the translational invariance of the sensor array. In ESPRIT techniques, the complexity strictly depends on the number of sensors. ESPIRT techniques can reduce computational burden when dealing with a limited number of array elements in the antenna module 102, while the size of the correlation matrix becomes greater than those from MUSIC when large arrays are considered.

Matrix Pencil is an eigenvalue-based approach for the parameter identification of sparse exponential sums. The matrix pencil method technique can be used for estimating poles or frequencies from exponentially damped or undamped sinusoidal sequences. A singular generalized eigenvalue problem in this method can be solved in several different ways.

Deep learning techniques can also be used as a super-resolution processing technique. Deep learning techniques use machine learning algorithms with multiple layers to progressively extract higher level features from the radar returns. For example, deep learning can distinguish one cluster of radar returns for a pedestrian from another cluster for a parked vehicle. The deep learning techniques can also provide the dimensions of the vehicle or pedestrian. The deep learning techniques can utilize a Convolutional Neural Networks (CNN) to analyze the radar data for one or more regions of interest. Deep Learning methods can be used for object classification, object detection, and semantic segmentation.

It can be noted that deep learning may be used in conjunction with other super-resolution techniques. For example, an output of MUSIC super-resolution processing can be provided as an input to a deep learning process. This can be used for additional super-resolution processing (achieving higher resolution) and/or other functionality. In some embodiments, for example, deep learning may be used to optimize parameters in the controller 210, region of interest determination 206, and/or pre-processing 204, which can lead to the increased effectiveness and/or efficiency of these functions.

Similarly, in various embodiments, the outputs of the super-resolution processing 208 can be provided to a controller 210 to reconfigure the functionality of the RF front-end 202 or other blocks of FIG. 2. The controller 210 can configure the RF front-end 202 to search at certain angles or ranges of interest based at least in part on the output of the super-resolution processing 208. For example, the controller 210 may use an output of the super-resolution processing 208 to cause the RF front-end 202 to employ beam-forming techniques focus on a certain region within the scan area of the radar system based on objects identified in the certain region by super-resolution processing. This reconfiguration can improve resolution of objects or targets.

In some embodiments, the parameters of the region of interest determination 206 and/or super-resolution processing block 208 can be changed based on a detected context. For example, super-resolution processing under low traffic areas can be configured differently than for high traffic areas. In low traffic scenarios, the region of interest determination 206 can identify regions of interest based on 1-2 peak intensity values in the radar data. In high traffic scenarios, however, the region of interest determination 206 may identify regions of interest for 6-8 peak intensity values, for example. Contextual information can be received from radar data and/or other data received from a vehicle (e.g., from vehicle sensors, map information, or vehicle to everything (V2X) information messages, etc.). In some embodiments, this information may be provided to the controller 210 by the central computer 212.

The controller 210 may be executed by a processing unit (e.g., DSP 110 or MCU 112), which, as noted, may comprise the super-resolution processing 208 and/or region of interest determination 206. The processing unit may be incorporated into an edge computing device 106, and part of a radar system 100 in communication with a central computer 212. An output of the controller and/or super-resolution processing 208 may be provided to the central computer 212. This may include indicating the location, speed, and/or movement of detected objects.

As noted, the controller 210 can configure other blocks illustrated in FIG. 2, including super-resolution processing 208, region of interest determination 206, pre-processing 204, and RF front-end 202. Such configuration can impact the way in which the functionality of these blocks are performed, such as how a region of interest determination is made, which super-resolution processing technique(s) to implement, which pre-processing technique(s) to use, how frequently scans are to be performed, and the like.

The central computer 212, which may correspond to the central computer 108 and FIG. 1, can receive the processed radar data. The processed radar data can be used for multi-sensor aggregation, radar deep perception, camera perception, and one or more positioning techniques. The processed radar data can be used for decision making for autonomous or semi-autonomous driving systems. For example, the radar sensor data provided to the central computer 212 can be used for automated parking features on a vehicle. Thus, improvement in the output of the radar sensor using the super-resolution processing techniques provided herein can ultimately result in improved performance by the vehicle itself.

Again, the block diagram 200 is an example embodiment of a generic architecture capable of identifying regions of interest and performing super-resolution processing in the manner described herein, which may be implemented in the architecture illustrated in FIG. 1. Alternative embodiments may implement functionality differently by combining, separating, and/or rearranging the blocks of FIG. 2. For example, in some embodiments, one or more functions of the controller 210 may be performed by the central computer 212. Additionally or alternatively, one or more functions provided by the super-resolution processing 208 described above can be shared between the super-resolution processing 208, controller 210, and/or central computer 212.

Figure 3:
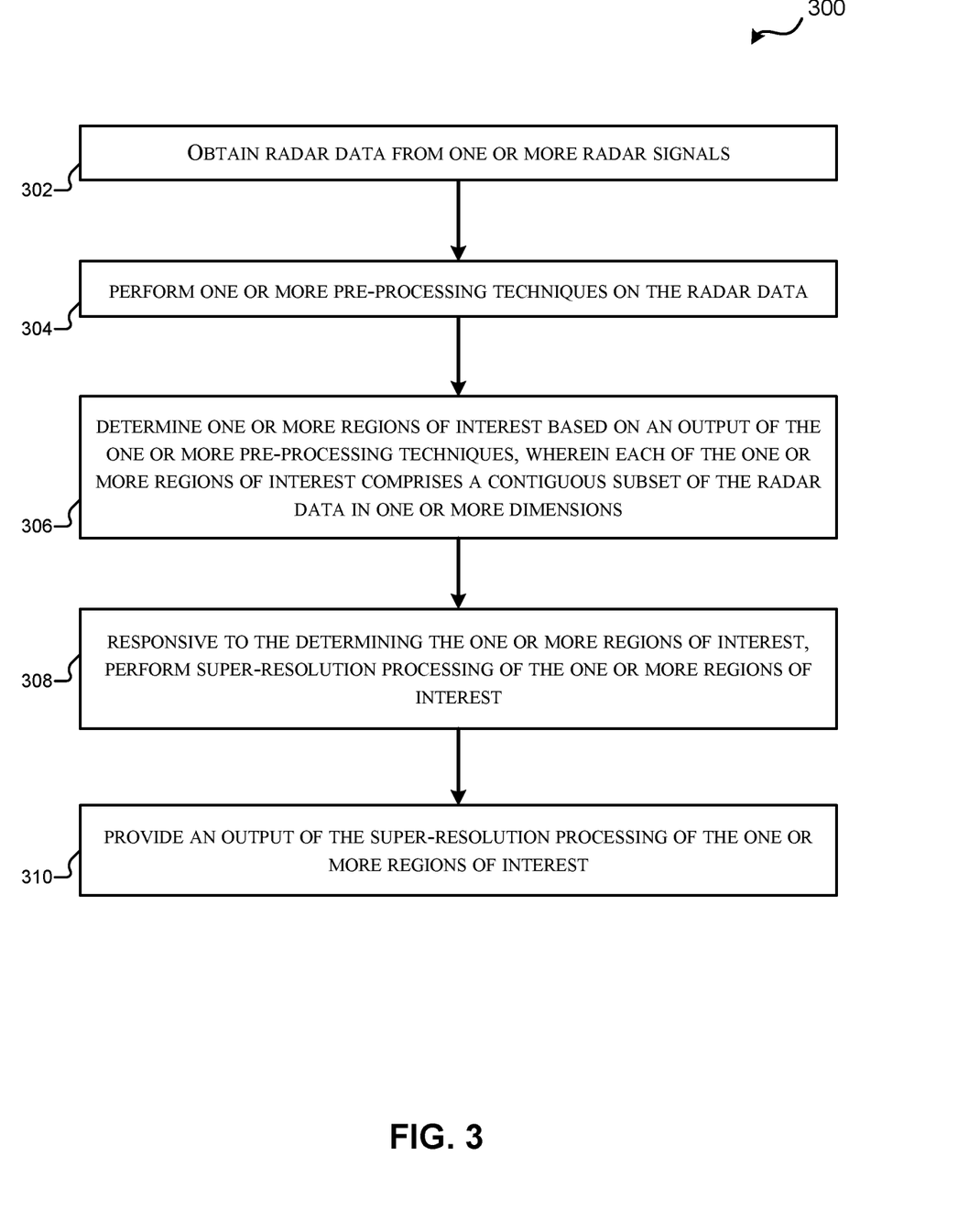
FIG. 3 is a flow diagram of a method of performing super-resolution of radar data, according to an embodiment.

FIG. 3 is a flow diagram of a method 300 of providing super-resolution for radar, according to an embodiment. The method 300 captures a portion of the functionality described in the embodiments above and illustrated in FIGS. 1-2. One or more of the functions described in the blocks illustrated in FIG. 3 may be performed by software and/or hardware components, such as one or more components of the edge computing device 106 of FIG. 1, or, more generally, one or more components of the electronic device 400 illustrated in FIG. 4 (described in more detail below) and/or a computer system such as the mobile computer system 500 illustrated in FIG. 5 (also described in more detail below). Components may comprise and/or be communicatively coupled with a radar system such as the radar system 100 shown in FIG. 1, and may be functionally separated as indicated in the blocks of FIG. 2. A person of ordinary skill in the art will appreciate that alternative embodiments may vary in the way they implement the functions illustrated in FIG. 3 by adding, omitting, combining, separating, and otherwise varying the functions illustrated in the blocks of FIG. 3.

At block 302, the technique includes obtaining radar data from one or more radar signals. The radar signals may be obtained by one or more Rx antennas antenna of an antenna module 102, as shown in FIG. 1. Radar signals may further comprise a radar return of signals transmitted by one or more Tx antennas of the antenna module 102. The corresponding radar data may comprise intensity (e.g., SNR) values of the radar signals which can be sent from an RX front-end 202 (e.g. antenna module 102 and transceiver 104) to a separate device (e.g., edge computing device 106) for pre-processing 202. As noted, additional or alternative means for performing the functionality at block 302 can include one or more components of an electronic device (e.g., illustrated in FIG. 4) and/or one or more components of a mobile computer system (e.g., illustrated in FIG. 5).

At block 304, the method 300 comprises performing one or more pre-processing techniques on the radar data. As described in the embodiments above, the one or more pre-processing techniques can include performing an FFT to obtain one of a range tensor, a Doppler tensor, an azimuth tensor, or an elevation tensor, or any combination thereof. In some embodiments, the one or more pre-processing techniques comprises performing CFAR detection on the radar data, clustering of intensity values of the radar data, tracking of intensity values of the radar data, or identifying one or more peaks in intensity values of the radar data; or any combination thereof.

Means for performing the functionality at block 304 can include, for example, one or more accelerator elements 116, DSPs 110, microcontrollers 112 of the edge computing device 106, and/or other hardware and/or software components of a radar sensor as illustrated in FIG. 1. As noted, additional or alternative means for performing the functionality at block 302 can include one or more components of an electronic device (e.g., illustrated in FIG. 4) and/or one or more components of a mobile computer system (e.g., illustrated in FIG. 5).

At block 306, the method 300 comprises determining one or more regions of interest based on an output of the one or more pre-processing techniques, wherein each of the one or more regions of interest comprises a continuous subset of the radar data in one or more dimensions. As previously described, a region of interest may comprises series of N contiguous values (a window) in a dimension, which may be centered at one or more radar data values identified in pre-processing (peak, cluster, track, etc.). The region of interest be defined in multiple dimensions (e.g., $N_1 \times N_2 \times N_3 \ldots$), where, for each dimension, the grid comprises a series of contiguous values in the radar data. The number of values in each dimension may vary. The selection of a region of interest results in the culling of data. As such, the series of N contiguous values in at least one dimension comprises a subset of values for the dimension.

As noted, the determination of the regions of interest may vary. According to some embodiments, determining the one or more regions of interest may comprise obtaining a threshold value, comparing intensity values of a plurality raw tensors of the radar data to the threshold value, and determining the one or more regions of interest based at least in part on the comparison. According to some embodiments, determining the one or more regions of interest comprises defining a region of interest in one or more dimensions around and identified peak in intensity values of the radar data. According to some embodiments, determining the one or more regions of interest comprises defining a region of interest in one or more dimensions around one or more points remaining after performing CFAR processing of the radar data. According to some embodiments, determining the one or more regions of interest comprises defining a region of interest in one or more dimensions around an identified cluster of intensity values in the radar data. According to some embodiments, determining the one or more regions of interest comprises defining a region of interest in one or more dimensions around intensity values of the radar data associated with merging tracks. Embodiments may additionally or alternatively determine the one or more regions of interest is based on identifying track changes using Kalman Filtering, Extended Kalman filtering, particle filters or unscented Kalman filters.

Means for performing the functionality at block 306 can include, for example, one or more accelerator elements 116, DSPs 110, microcontrollers 112 of the edge computing device 106, and/or other hardware and/or software components of a radar sensor as illustrated in FIG. 1. As noted, additional or alternative means for performing the functionality at block 302 can include one or more components of an electronic device (e.g., illustrated in FIG. 4) and/or one or more components of a mobile computer system (e.g., illustrated in FIG. 5).

At block 308, the method 300 comprises, responsive to the determining the one or more regions of interest, performing super-resolution processing of the one or more regions of interest. As described in the embodiments above, this super-resolution processing may comprise any combination of MUSIC, ESPRIT, Matrix Pencil, and/or deep learning processing, for example. Super-resolution processing may result in increased resolution of the radar data, and additional values (peaks, clusters, etc.) within the additional data provided by the increased resolution. Super-resolution may additionally or alternatively identify these additional values as detected objects, providing a location, speed, movement data, etc. for each of the objects.

Means for performing the functionality at block 308 can include, for example, one or more accelerator elements 116, DSPs 110, microcontrollers 112 of the edge computing device 106, and/or other hardware and/or software components of a radar sensor as illustrated in FIG. 1. As noted, additional or alternative means for performing the functionality at block 302 can include one or more components of an electronic device (e.g., illustrated in FIG. 4) and/or one or more components of a mobile computer system (e.g., illustrated in FIG. 5).

At 310, the method 300 comprises providing an output of this super-resolution processing of the one or more regions of interest. As noted, the output of super-resolution processing may comprise radar data having additional resolution (additional values). Additionally or alternatively, super-resolution processing may output detected objects. This may comprise, for example, a location, speed, movement data, etc. for each detected object. The output of super the resolution processing might be utilized by a vehicle computer (e.g., fused with data from other types of sensors) to determine information regarding the vehicle's surroundings, which may impact various vehicular systems (e.g., automated and/or semi-automated functionality, navigation systems, warning systems, etc.).

Additionally or alternatively, the output of super-resolution can be provided to deep learning for additional processing (e.g., prior to providing information to a central computer). For example, a super processing algorithm may receive 64 radar data values (e.g., intensity values) and return 256 values. This increased amount of data further can be processed by deep learning to extract information from the radar data (identifying objects, determining object location, movement behavior, etc.). The output of the deep learning can then be provided to a central computer. Because of the high bandwidth demands between the output of the super processing and the input of the deep learning, some embodiments may perform deep learning at an edge computer or other component in or near a radar sensor. The output of the super-resolution processing and/or deep learning processing can be sent via a bus or one or more wired connections to a central computer system Means for performing the functionality at block 310 can include, for example, one or interfaces 114 of the edge computing device 106, interfaces 114 and/or other hardware and/or software components of a radar sensor as illustrated in FIG. 1 and described in further detail below. As noted, additional or alternative means for performing the functionality at block 302 can include one or more components of an electronic device (e.g., illustrated in FIG. 4) and/or one or more components of a mobile computer system (e.g., illustrated in FIG. 5).

Figure 4:
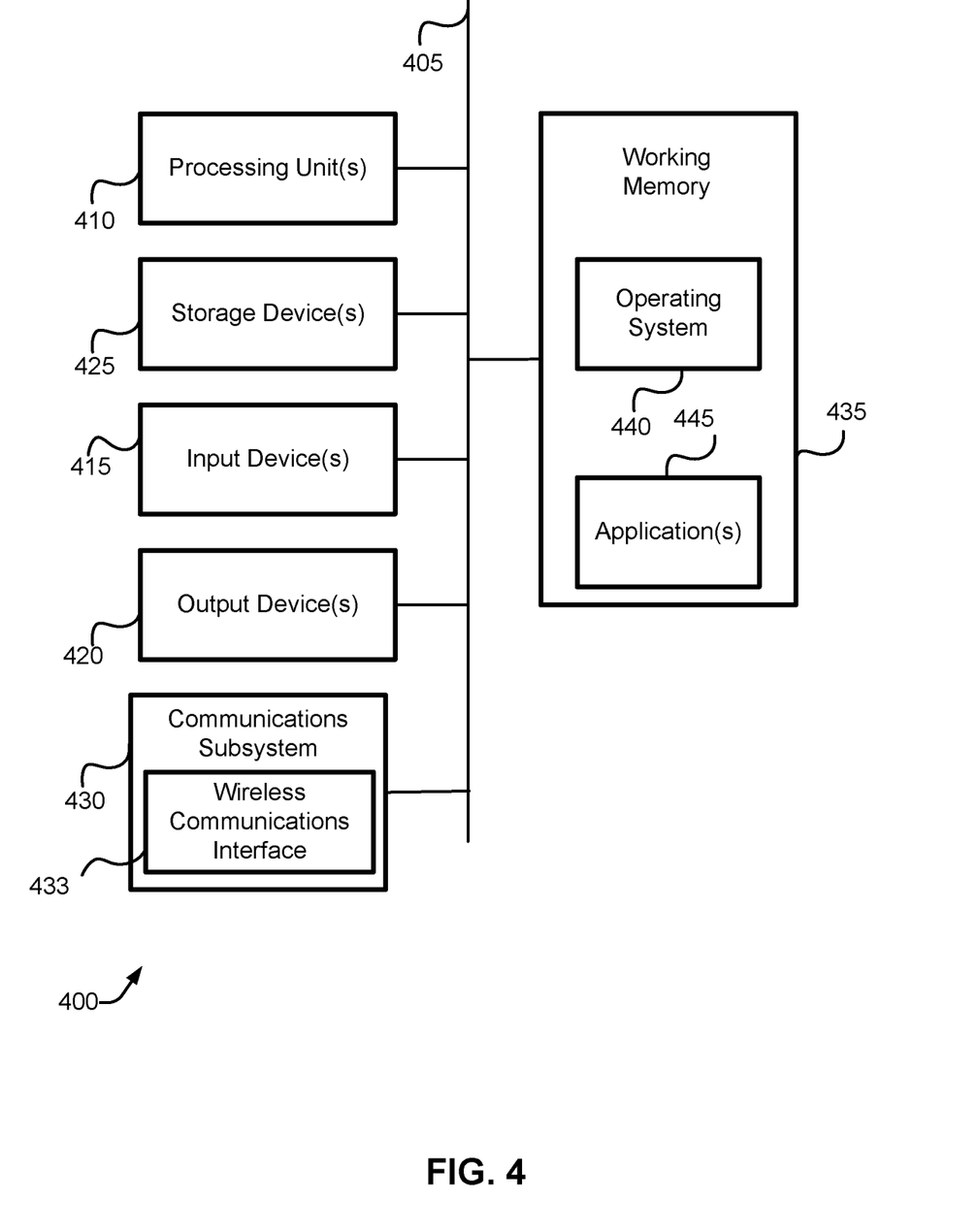
FIG. 4 is a block diagram of an electronic device, according to an embodiment.

FIG. 4 illustrates an embodiment of an electronic device 400, which may comprise or otherwise utilize a radar system capable of performing the techniques for providing super-resolution for radar described herein. FIG. 4 provides a schematic illustration of one embodiment of an electronic device 400 that can perform the methods provided by various other embodiments, such as the methods described in FIG. 3.

It is noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner. In addition, it can be noted that components illustrated by FIG. 4 can be localized to a single device and/or distributed among various networked devices, which may be disposed at different physical or geographical locations.

The electronic device 400 is shown comprising hardware elements that can be electrically coupled via a bus 405 (or may otherwise be in communication, as appropriate). The hardware elements may include processing unit(s) 410, which can include without limitation one or more general-purpose processors, one or more special-purpose processors (such as a DSP, Graphics Processing Unit (GPU), Application Specific Integrated Circuit (ASIC), Field-Programmable Gate Array (FPGA), and/or the like), and/or other processing structure, which can be configured to perform one or more of the methods described herein, including the method described in relation to FIG. 4. The electronic device 400 also can include one or more input devices 415, which can include without limitation a mouse, a keyboard, a touchpad, a camera, a microphone, and/or the like; and one or more output devices 420, which can include without limitation a display device, a printer, a speaker, and/or the like.

The electronic device 400 may further include (and/or be in communication with) one or more non-transitory storage device(s) 425, which can comprise, without limitation, local and/or network accessible storage, and/or can include, without limitation, a disk drive, a drive array, an optical storage device, a solid-state storage device, such as a Random Access Memory (RAM), and/or a Read Only Memory (ROM), which can be programmable, flash-updateable, and/or the like. Such storage devices may be configured to implement any appropriate data stores, including without limitation, various file systems, database structures, and/or the like.

The electronic device 400 may also include a communications subsystem 430, which can include support of wireline communication technologies and/or wireless communication technologies (in some embodiments) managed and controlled by a wireless communication interface 433. The communications subsystem 430 may include a modem, a network card (wireless or wired), an infrared communication device, a wireless communication device, and/or a chipset, and/or the like. The communications subsystem 430 may include one or more input and/or output communication interfaces, such as the wireless communication interface 433, to permit data and signaling to be exchanged with a network, mobile devices, and/or other electronic devices. In some embodiments, a radar sensor (e.g., comprising the radar system 100 of FIG. 1) may be incorporated into a wireless communications interface 433 such that antenna elements in a transmitter antenna array (e.g., Tx antenna as part of antenna module 102) and receiver antenna array (e.g., Rx antenna as part of antenna module 102), and the circuitry connected with the antenna elements (e.g., transceiver 104, edge computing device 106), may be used for both radar detection and data communication. For example, in some embodiments, the wireless communication interface 433 may comprise an 802.11ad- and/or 802.11ay-compatible modem capable of both radar imaging and data communication. Institute of Electrical and Electronic Engineers (IEEE) 802.11ad is a wireless standard that uses the 60 gigahertz (GHz) spectrum instead of the 5 GHz and 2.4 GHz used by most Wi-Fi connections. IEEE 802.11ad has a theoretical max speed of 7 gigabits per second (Gbps), vs 3.2 Gbps for 802.11ac Wave 2. IEEE 802.11ay is a type of wireless local area network (WLAN) in the IEEE 802.11 set of WLANs. It will have a frequency of 60 GHz, a transmission rate of 20-40 Gbps and an extended transmission distance of 300-500 meters. IEEE 802.11ay is a type of WLAN in the IEEE 802.11 set of WLANs. IEEE 802.11ay has a frequency of 60 GHz, a transmission rate of 20-40 Gbps and an extended transmission distance of 300-500 meters. Alternatively, a radar sensor and accompanying circuitry may be separate from the communications subsystem 430. In such embodiments, a radar sensor may be utilized as an input device 415. As such, the radar sensor may correspond to a radar system 100 of FIG. 1, and the electronic device 400 of FIG. 4 may correspond to the central computer system 108 of FIG. 1.

In many embodiments, the electronic device 400 will further comprise a working memory 435, which can include a RAM and/or or ROM device. Software elements, shown as being located within the working memory 435, can include an operating system 440, device drivers, executable libraries, and/or other code, such as application(s) 445, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 3, may be implemented as code and/or instructions that are stored (e.g. temporarily) in working memory 435 and are executable by a computer (and/or a processing unit within a computer such as processing unit(s) 410); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 425 described above. In some cases, the storage medium might be incorporated within a computer system, such as electronic device 400. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 400 and/or might take the form of source and/or installable code, which, upon compilation and/or installation on the electronic device 400 (e.g., using any of a variety of generally available compilers, installation programs, compression/decompression utilities, etc.), then takes the form of executable code.

It can be noted that, although particular frequencies, integrated circuits (ICs), hardware, and other features are described in the embodiments herein, alternative embodiments may vary. That is, alternative embodiments may utilize additional or alternative frequencies (e.g., other 60 GHz and/or 28 GHz frequency bands, or even outside mm Wave frequencies (30 GHz to 300 GHz), antenna elements (e.g., having different size/shape of antenna element arrays), scanning periods (including both static and dynamic scanning periods), electronic devices (e.g., mobile phones, tablets, PCs, etc.), and/or other features. A person of ordinary skill in the art will appreciate such variations.

Figure 5:
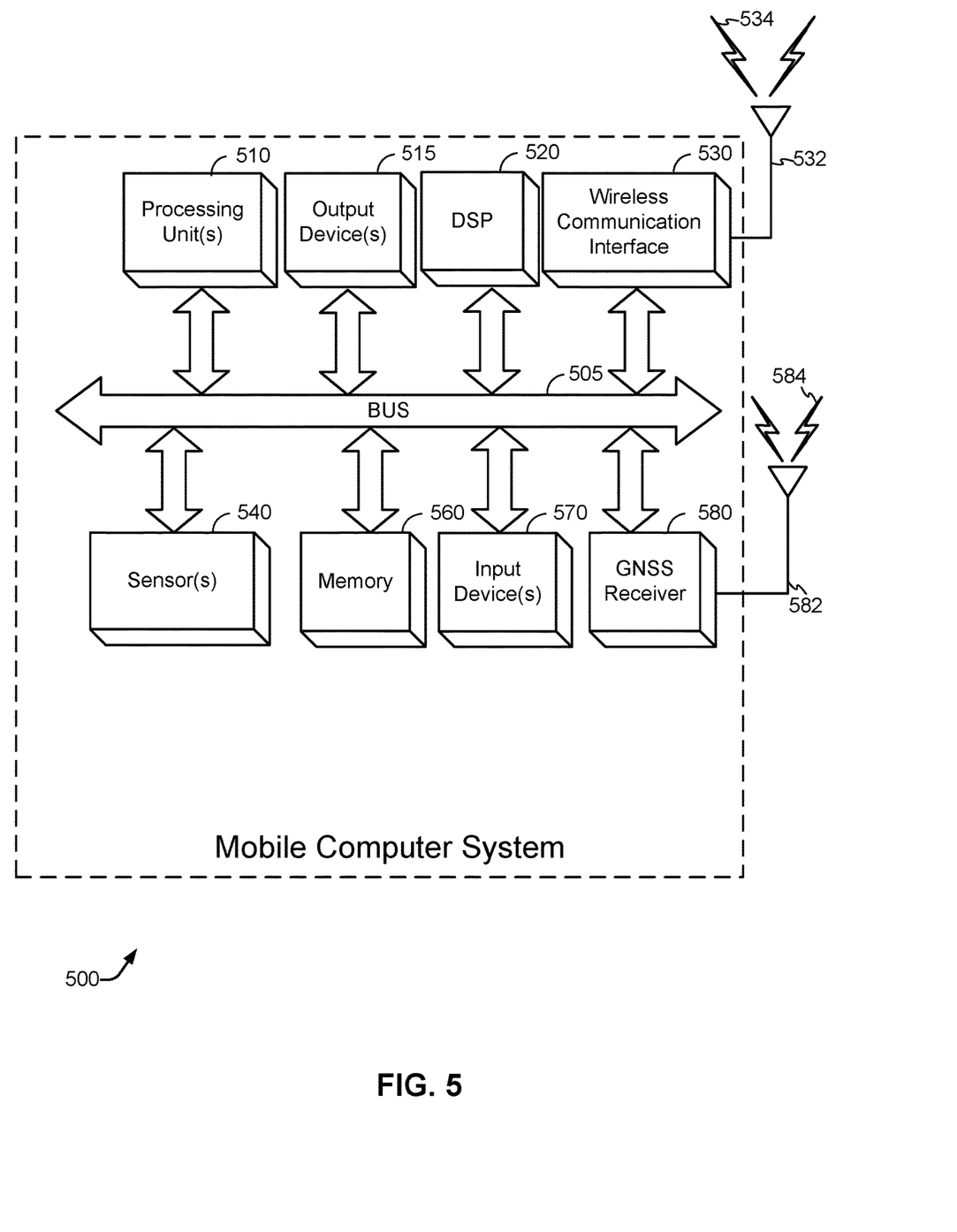
FIG. 5 is a block diagram of an embodiment of a mobile computer system.

FIG. 5 illustrates an embodiment of a mobile computer system 500, which may be utilized as described herein above. For example, the mobile computer system 500 may be utilized on a vehicle and may therefore corresponds to a central computer (e.g., central computer 108 of FIG. 1 and/or central computer 212 of FIG. 2). The mobile computer system 500 may be receive information from a radar sensor, and therefore may receive and output of super-resolution processing (e.g., at block 310 of FIG. 3). It should be noted that FIG. 5 is meant only to provide a generalized illustration of various components, any or all of which may be utilized as appropriate. It can be noted that, in some instances, components illustrated by FIG. 5 can be localized to a single physical device and/or distributed among various networked devices, which may be disposed at different physical locations on a vehicle. When utilized by a vehicle, the mobile computer system 500 may comprise or be integrated into a vehicle computer system used to manage one or more systems related to the vehicle's navigation and/or automated driving, as well as communicate with other onboard systems and/or other traffic entities. According to some embodiments, the mobile computer system 500 may comprise a standalone device or component of a vehicle, which may be communicatively coupled with other components/devices of the vehicle.

The mobile computer system 500 is shown comprising hardware elements that can be electrically coupled via a bus 505 (or may otherwise be in communication, as appropriate). The hardware elements may include a processing unit(s) 510 which can include without limitation one or more general-purpose processors, one or more special-purpose processors (such as DSP chips, graphics processing unit (GPU), ASICs, and/or the like), and/or other processing structure or means. As shown in FIG. 5, some embodiments may have a DSP 520, depending on desired functionality. Sensor calibration and/or processing of calibration information and/or sensor measurement information may be provided in the processing unit(s) 510. The processing can occur across a plurality of components (e.g., a DSP 520, one or more processing unit(s) 510 (e.g., a CPU), a GPU, and/or other dedicated hardware.)

The mobile computer system 500 also can include one or more input devices 570, which can include devices related to user interface (e.g., a touch screen, touch pad, keyboard, keypad, microphone, button(s), dial(s), switch(es), and/or the like) and/or devices related to navigation, automated driving, and the like. Similarly, the one or more output devices 515 may be related to interacting with a user (e.g., via a display, light emitting diode(s) (LED(s)), speaker(s), etc.), and/or devices related to navigation, automated driving, and the like.

The mobile computer system 500 may also include a wireless communication interface 530, which may comprise, without limitation, a modem, a network card, an infrared communication device, a wireless communication device, and/or a chipset (such as a Bluetooth® device, an IEEE 802.11 device, an IEEE 802.15.4 device, a Wi-Fi device, a WiMAX (Worldwide Interoperability for Microwave Access) device, a Wide Area Network (WAN) device, and/or various cellular devices), and/or the like. The wireless communication interface 530 can enable the mobile computer system 500 to communicate to other devices, directly or via a communication network. And as such, it may be capable of transmitting direct communications, broadcasting wireless signals, receiving direct and/or broadcast wireless signals, and so forth. Accordingly, the wireless communication interface 530 may be capable of sending and/or receiving RF signals from various RF channels/frequency bands. Communication using the wireless communication interface 530 can be carried out via one or more wireless communication antenna(s) 532 that send and/or receive wireless signals 534. According to some embodiments, the wireless communication antenna(s) 532 may comprise a plurality of discrete antennas, antenna arrays, or any combination thereof.

The mobile computer system 500 can further include sensors 540. In the embodiments described above, this can include the sensor to be calibrated and/or one or more additional sensors for cross-calibration. Sensors 540 may comprise, without limitation, one or more accelerometers, gyroscopes, cameras, magnetometers, altimeters, microphones, proximity sensors, light sensors, barometers, radars, light detection and ranging (LIDAR) devices, and the like. According to some embodiments, the sensor(s) 540 may include one or more radar sensors comprising a radar system 100, as illustrated in FIG. 1 in capable of providing super-resolution processing of radar data in the manner in the previously-described embodiments. Sensors 540 (including a one or more radar sensors) may be used, for example, to determine certain real-time characteristics of the vehicle and nearby objects, such as location, velocity, acceleration, and the like. To determine these characteristics, the mobile computer system 500 may fuse data from a variety of sensors 540 (e.g., using the processing unit(s) 510 and/or DSP 520).

Embodiments of the mobile computer system 500 may also include a Global Navigation Satellite System (GNSS) receiver 580 capable of receiving signals 584 from one or more GNSS satellites using an antenna 582 (which could be the same as wireless communication antenna(s) 532). Positioning based on GNSS signal measurement can be utilized to determine a current location of the mobile computer system 500, and may further be used as a basis to determine the location (e.g., absolute coordinates) of one or more objects detected by radar. The GNSS receiver 580 can extract a position of the mobile computer system 500, using conventional techniques from GNSS satellites of a GNSS system, such as Global Positioning System (GPS) and/or similar systems.

The mobile computer system 500 may further include and/or be in communication with a memory 560. The memory 560 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 560 of the mobile computer system 500 also can comprise software elements (not shown in FIG. 5), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 560 that are executable by the mobile computer system 500 (and/or processing unit(s) 510 or DSP 520 within mobile computer system 500). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a Programmable ROM (PROM), Erasable PROM (EPROM), a flash-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. In addition, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It will be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it is noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. In addition, a number of steps may be undertaken before, during, or after the above elements are considered. Accordingly, the above description does not limit the scope of the disclosure.

What is claimed is:

1. A method of providing super-resolution for radar, the method comprising:
   obtaining radar data from one or more radar reflections received by antennas of a radar system;
   performing one or more pre-processing techniques on the radar data;
   determining one or more regions of interest based on an output of the one or more pre-processing techniques, wherein each of the one or more regions of interest comprises a contiguous subset of the radar data in one or more dimensions and wherein determining the one or more regions of interest comprises defining a region of interest in one or more dimensions around one or more points remaining after performing CFAR processing of the radar data;
   responsive to the determining the one or more regions of interest, performing super-resolution processing on the radar data of the one or more regions of interest;
   providing an output of the super-resolution processing of the one or more regions of interest; and
   beam-forming a radar signal in a region of a detected target object, based on the output of the super-resolution processing.

2. The method of claim 1, wherein the contiguous subset of the radar data is defined by at least one of a window or a grid around each of one or more intensity values in the radar data, and wherein the one or more pre-processing techniques comprise performing a Fast Fourier Transform on the radar data to obtain one of:
   a range tensor,
   a Doppler tensor,
   an azimuth tensor, or
   an elevation tensor, or
   any combination thereof.

3. The method of claim 2, wherein the at least one of the window or the grid comprises one or more of an azimuth dimension, an elevation dimension, a Doppler dimension, and a range dimension, and wherein the one or more pre-processing techniques comprises:
   clustering of intensity values of the radar data;
   tracking of intensity values of the radar data; or
   identifying one or more peaks in intensity values of the radar data; or
   any combination thereof.

4. The method of claim 1, wherein determining the one or more regions of interest comprises:
   obtaining a threshold value;
   comparing intensity values of a plurality raw tensors of the radar data to the threshold value; and
   determining the one or more regions of interest based at least in part on the comparison.

5. The method of claim 1, wherein determining the one or more regions of interest comprises defining a region of interest in one or more dimensions around an identified peak in intensity values of the radar data.

6. The method of claim 1, wherein determining the one or more regions of interest comprises defining a region of interest in one or more dimensions around an identified cluster of intensity values in the radar data, and wherein the method further comprises:
   implementing a learning technique comprising identifying and classifying detected objects based on the output of the super-resolution processing.

7. The method of claim 1, wherein determining the one or more regions of interest comprises defining a region of interest in one or more dimensions around intensity values of the radar data.

8. The method of claim 1, wherein the super-resolution processing comprises Multi Signal Classification (MUSIC), Estimation of Signal Parameters by Rotational Invariance Techniques (ESPRIT), Matrix Pencil, or deep learning processing, or any combination thereof.

9. The method of claim 1, wherein the super-resolution processing comprises identifying one or more targets within two regions of interest and performing the super-resolution processing upon a union of the two regions of interest.

10. A device comprising:
    a transceiver;
    a memory; and
    one or more processing units communicatively coupled with the transceiver and the memory, the one or more processing units configured to:
       obtain, via the transceiver, radar data from one or more radar reflections received by antennas of a radar system;
       perform one or more pre-processing techniques on the radar data;
       determine one or more regions of interest based on an output of the one or more pre-processing techniques, wherein each of the one or more regions of interest comprises a contiguous subset of the radar data in one or more dimensions and wherein, to determine the one or more regions of interest, the one or more processing units are configured to define a region of interest in one or more dimensions around one or more points remaining after performing CFAR processing of the radar data;

responsive to the determining the one or more regions of interest, perform super-resolution processing on the radar data of the one or more regions of interest;

provide an output of the super-resolution processing of the one or more regions of interest; and beam-forming a radar signal in a region of a detected target object, based on the output of the super-resolution processing.

11. The device of claim 10, wherein, to perform the one or more pre-processing techniques on the radar data, the one or more processing units are configured to perform a Fast Fourier Transform on the radar data to obtain one of a range tensor, a Doppler tensor, an azimuth tensor, or an elevation tensor, or any combination thereof.

12. The device of claim 10, wherein, to perform the one or more pre-processing techniques on the radar data, the one or more processing units are configured to:

perform constant false alarm rate detection (CFAR) on the radar data;

cluster of intensity values of the radar data;

track of intensity values of the radar data; or identify one or more peaks in intensity values of the radar data; or any combination thereof.

13. The device of claim 10, wherein, to determine the one or more regions of interest, the one or more processing units are configured to:

obtain a threshold value;

compare intensity values of a plurality raw tensors of the radar data to the threshold value; and determine the one or more regions of interest based at least in part on the comparison.

14. The device of claim 10, wherein, to determine the one or more regions of interest, the one or more processing units are configured to define a region of interest in one or more dimensions around an identified peak in intensity values of the radar data.

15. The device of claim 10, wherein, to determine the one or more regions of interest, the one or more processing units are configured to define a region of interest in one or more dimensions around an identified cluster of intensity values in the radar data.

16. The device of claim 10, wherein, to determine the one or more regions of interest, the one or more processing units are configured to define a region of interest in one or more dimensions around intensity values of the radar data.

17. The device of claim 10, wherein, to perform the super-resolution processing, the one or more processing units are configured to:

perform Multi Signal Classification (MUSIC), perform Estimation of Signal Parameters by Rotational Invariance Techniques (ESPRIT), perform Matrix Pencil, or perform deep learning processing, or any combination thereof.

18. The device of claim 10, to perform the super-resolution processing, the one or more processing units are configured to identify one or more targets within the one or more regions of interest.

19. A device comprising:

means for obtaining radar data from one or more radar reflections received by antennas of a radar system;

means for performing one or more pre-processing techniques on the radar data;

means for determining one or more regions of interest based on an output of the one or more pre-processing techniques, wherein each of the one or more regions of interest comprises a contiguous subset of the radar data in one or more dimensions and wherein the means for determining the one or more regions of interest comprises means for defining a region of interest in one or more dimensions around one or more points remaining after performing CFAR processing of the radar data;

means for performing super-resolution processing on the radar data of the one or more regions of interest in response to the determining the one or more regions of interest;

means for an output of the super-resolution processing of the one or more regions of interest; and means for beam-forming a radar signal in a region of a detected target object, based on the output of the super-resolution processing.

20. The device of claim 19, wherein the means for performing the one or more pre-processing techniques comprises means for performing a Fast Fourier Transform on the radar data to obtain one of:

a range tensor, a Doppler tensor, an azimuth tensor, or an elevation tensor, or any combination thereof.

21. The device of claim 19, wherein the means for performing the one or more pre-processing techniques comprises:

means for performing constant false alarm rate detection (CFAR) on the radar data;

means for clustering of intensity values of the radar data;

means for tracking of intensity values of the radar data; or means for identifying one or more peaks in intensity values of the radar data; or any combination thereof.

22. The device of claim 19, wherein the means for determining the one or more regions of interest comprises:

means for obtaining a threshold value;

means for comparing intensity values of a plurality raw tensors of the radar data to the threshold value; and means for determining the one or more regions of interest based at least in part on the comparison.

23. The device of claim 19, wherein the means for determining the one or more regions of interest comprises means for defining a region of interest in one or more dimensions around an identified peak in intensity values of the radar data.

24. The device of claim 19, wherein the means for determining the one or more regions of interest comprises means for defining a region of interest in one or more dimensions around an identified cluster of intensity values in the radar data.

25. The device of claim 19, wherein the means for determining the one or more regions of interest comprises means for defining a region of interest in one or more dimensions around intensity values of the radar data.

26. The device of claim 19, wherein the means for performing super-resolution processing comprises:

means for performing Multi Signal Classification (MUSIC), means for performing Estimation of Signal Parameters by Rotational Invariance Techniques (ESPRIT), Matrix Pencil, or means for performing deep learning processing, or any combination thereof.

27. A non-transitory computer-readable medium having instructions stored thereby which, when executed by one or more processing units, cause the processing units to perform functions including:
- obtaining radar data from one or more radar reflections received by antennas of a radar system;
- performing one or more pre-processing techniques on the radar data;
- determining one or more regions of interest based on an output of the one or more pre-processing techniques, wherein each of the one or more regions of interest comprises a contiguous subset of the radar data in one or more dimensions and wherein determining the one or more regions of interest comprises defining a region of interest in one or more dimensions around one or more points remaining after performing CFAR processing of the radar data;
- responsive to the determining the one or more regions of interest, performing super-resolution processing on the radar data of the one or more regions of interest;
- providing an output of the super-resolution processing of the one or more regions of interest; and
- beam-forming a radar signal in a region of a detected target object, based on the output of the super-resolution processing.

* * * * *